C. E. MACDUFFEE.
SUBMARINE DIVING APPARATUS.
APPLICATION FILED DEC. 6, 1910.
989,534.
Patented Apr. 11, 1911.
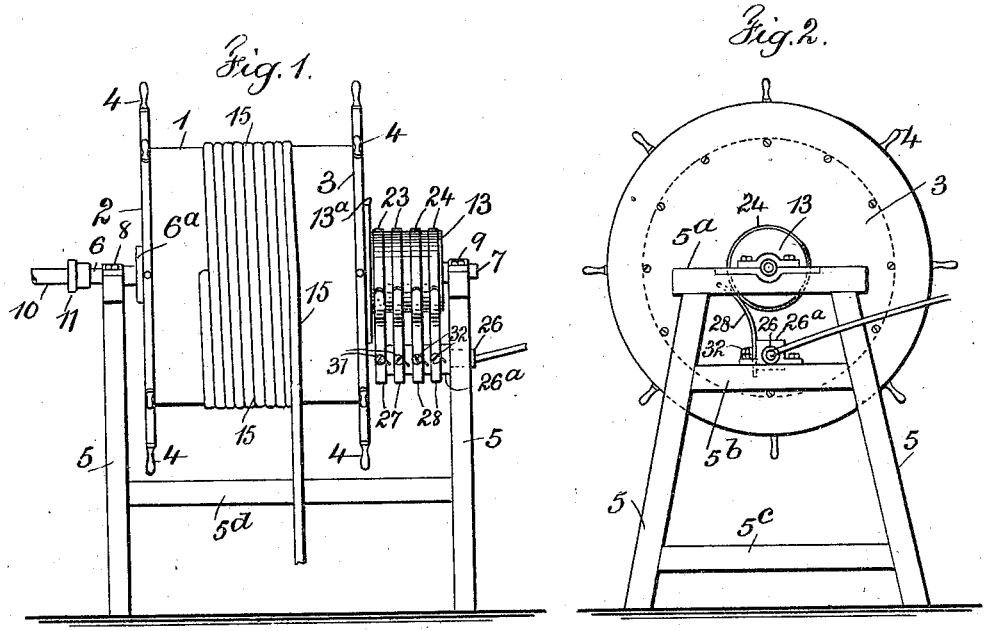
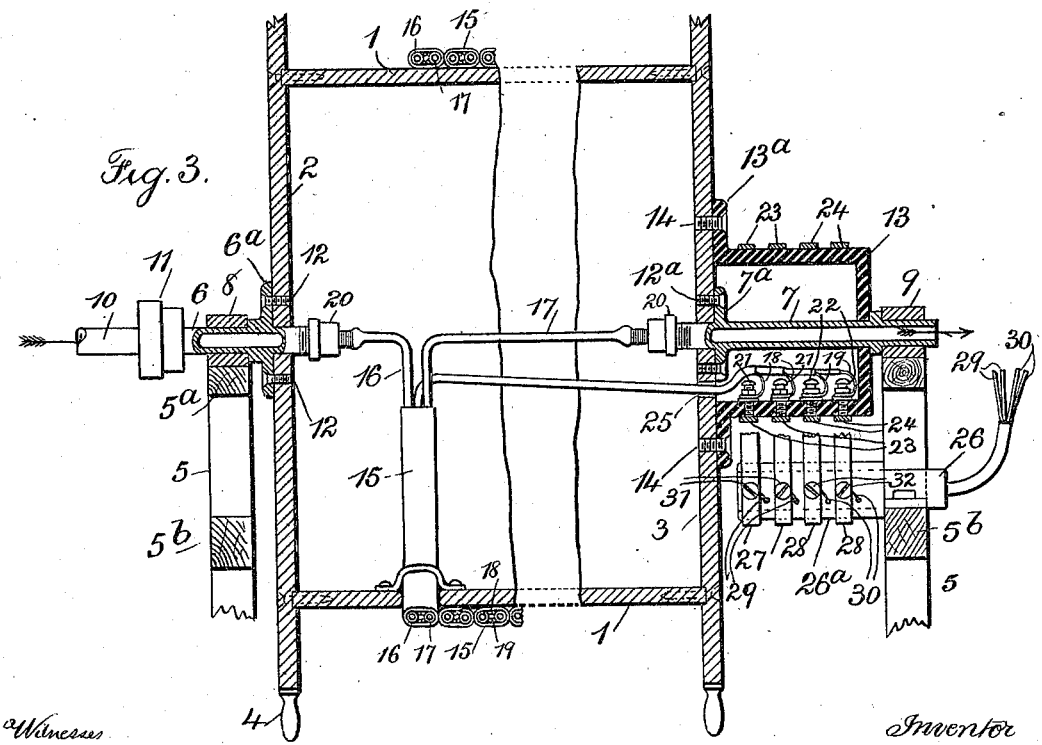

UNITED STATES PATENT OFFICE.

CHESTER E. MACDUFFEE, OF NEW YORK, N. Y., ASSIGNOR OF ONE-FIFTH TO GEORGE A. TRAVER, OF BROOKLYN, NEW YORK, ONE-FIFTH TO JAMES P. REID, OF NEW YORK, N. Y., ONE-FIFTH TO JOHN L. GORDON, OF WEST HOBOKEN, NEW JERSEY, AND ONE-FIFTH TO ERNEST MEYER, OF TUXEDO, NEW YORK.

SUBMARINE DIVING APPARATUS.

989,534.

Specification of Letters Patent. Patented Apr. 11, 1911.

Application filed December 6, 1910. Serial No. 595,851.

*To all whom it may concern:*

Be it known that I, CHESTER E. MACDUFFEE, a citizen of the United States, residing at the borough of Manhattan, city, county, and State of New York, have invented an Improvement in Submarine Diving Apparatus, of which the following is a specification.

My invention is particularly designed for use with deep sea diving apparatus, and relates to means for manipulating and making at all times fully effective the air tubes and electric conductors employed for supplying the diver with fresh air, telephone service and electric light, through a common cable adapted to be wound upon and unwound from a reel and consists in certain details of construction and combination of elements hereinafter fully described; the object of the invention being to reduce the number of elements passing through the water, to prevent tangling of air tubes and electric conductors when the diver is descending or ascending, and to generally facilitate the manipulation of the reel and cable without affecting the efficiency of the supply tubes and wires under all circumstances.

In the accompanying drawing, Figure 1 is an elevation of my improved device; Fig. 2 is an end view of the same; Fig. 3 is a longitudinal section and partial elevation of the device in larger size, the cylindrical body of the reel being broken away.

Similar reference numerals indicate like parts throughout the several views.

1 is the hollow cylindrical body of the reel, which may be of any suitable material.

2 and 3 are the respective heads of the cylindrical body 1. These heads are provided on their peripheries with spaced hand grips 4.

The supporting frame for the reel may be of any desired shape and material of sufficient strength, but I prefer and have shown it as consisting of the upright members 5, cross-head 5ª and cross-bars 5ᵇ, 5ᶜ, and 5ᵈ.

6 and 7 are tubular axles for the reel; these axles are journaled at 8 and 9 upon the cross-bars 5ª of the supporting frame. The ends of these axles extending within the cylindrical body 1, are exteriorly screw threaded; the other end of the axle 7, extends slightly beyond the supporting frame and is open ended. The outer end of the axle 6 is connected with an air supply pipe 10, by a swivel joint 11, which may be of any suitable character such as to allow free revolution of the axle 6, which axle has an integral outer annular flange 6ª, which comes against the outer surface of the head 2 of the cylindrical body 1, and by which means the axle 6 is permanently secured to said head by spaced apart screws 12, so that the axle 6 and body 1 turn together.

13 is a hollow cylindrical member of insulating material, open at one end, and having an out-turned flange 13ª around said open end, and this member is centrally secured to the head 3 of the reel body 1, by means of spaced bolts or screws 14, passing through holes in said flange and screwed into the head 3. The outer end of this cylindrical member 13 is closed except for a comparatively small circular opening in its center.

The axle 7 passes through a circular opening in the head 3, and extends centrally through the cylindrical member 13, and through the opening in its outer end. This axle 7 is permanently secured to the head 3 inside the member 13, in the same manner that the axle 6 is secured to the opposite head 2, that is, by the annular flange 7ª and screws or bolts 12ª so that the axle 7, member 13 and body 1 turn together.

15 is a flexible tubing within which are contained the air supply tube 16; the exhaled air tube 17; the telephone wires 18 and the conductors 19 for electric lighting. The upper part of this tubing 15, passes into the cylindrical body 1, through an opening therein, and that portion outside the cylindrical body is adapted to be wound and unwound upon said body, and to convey the air tubes and electric wires to an attachment on the armor of the diver.

The air tubes and electric conductors emerge from the tubing 15 at its upper end within the cylindrical body 1. The end of the air supply tube 16 being connected to the inner screw threaded end of the axle 6 by a suitable air tight coupling 20, while the end of the exhaled air tube 17 is similarly connected to the inner screw threaded end of the axle 7.

21, 21 and 22, 22 are binding posts within the cylindrical member 13. These binding posts are preferably exteriorly screw threaded on their lower ends and extend through holes in the member 13, interiorly screw threaded to receive them, but they may be retained therein, in any suitable manner in such position that their lower ends extend entirely through the member 13.

23, 23 and 24, 24, are spaced apart copper bands encircling and secured to the outer surface of the member 13, in line respectively with the binding posts 21, 21, 22, 22 and contacting with the lower ends of said binding posts.

The telephone wires 18, and the electric light wires 19, lead from the end of the tubing 15, within the body 1, through an opening 25 in the head 3, and pass into the cylindrical member 13, where the ends of the telephone wires are attached to the binding posts 21, 21, while the ends of the electric light wires are attached to the binding posts 22, 22.

26 is a tubular arm secured to one of the cross bars, 5ᵇ of the supporting frame, and surrounded by a sleeve, 26ᵃ of insulating material. This arm extends directly below the member 13 at a predetermined distance therefrom, and parallel therewith. Secured to this arm 26ᵃ are spaced brushes 27, 27 and 28, 28. These brushes are composed of flat strips of copper bent outward near their free ends and are arranged in line with the copper bands encircling the member 13, the brushes 27, 27 contacting with the bands 23, 23, while the brushes 28, 28 are in contact with the bands 24, 24.

Electric conductor wires 29 are connected to the brushes 27—27, by binding screws 31, and electric conductor wires 30 are connected to the brushes 28—28 by binding screws 32. These wires 29 and 30 are led through the tubular arm 26, being passed through holes in the same and its cover of insulating material for connection with the brushes and extend from the tubular arm to a switch board and battery or electric generator.

It will be readily seen that whether the reel is at rest or being revolved in either direction, the brushes 27, 27, and 28, 28 will always be in contact with the bands 23, 23 and 24, 24, so that when the electric current is on, the telephone circuit will be through the wires 29, brushes 27, bands 23, binding post 21 and wires 18, while the electric light circuit will be through the wires 30, brushes 28, bands 24, binding posts 22, and wires 19. The opening and closing of the electric circuits are controlled by the switchboard operator.

The reel will, of course, be located upon the deck of a boat or tender above water, and the electric generator switchboard, battery and air supply tanks will also be located in convenient positions upon the boat.

I claim as my invention:

1. In a device of the character described and in combination, a composite cable for supplying the diver with air and service by electric conductors, a reel upon which the cable is wound, devices extending through the reel, and its bearings for continuing the continuity of the air supply and devices located in part upon the reel and in part exteriorly thereof for continuing the continuity of the service by electric conductors whereby the said services are maintained constant and uninterrupted regardless of the wound up or unwound condition of the cable.

2. A device of the character described, comprising in combination, a hollow cylindrical body, a head on either side of said body and secured thereto, a hollow cylindrical member of insulating material permanently secured to one of said heads on its exterior surface, a tubular axle passing through one of said heads and permanently secured thereto, a second tubular axle passing through the other of said heads and through said cylindrical member of insulating material and permanently secured to said head, spaced bands of conducting material encircling the outer periphery of said cylindrical member of insulating material and secured thereto, binding posts within said cylindrical member and extending through holes therein spaced apart in line with said bands and contacting therewith on the outer surface of said cylindrical member, a supporting frame upon which each of said tubular axles are journaled, air tubes connected to the ends of said tubular axles within said cylindrical body, electric conductor wires connected to said binding posts, brushes contacting with said bands upon the cylindrical members, electric conductor wires connected with said brushes, and means for supporting said brushes.

3. A device of the character described, comprising in combination, a hollow cylindrical body, a head on either side of said body and secured thereto, a hollow cylindrical member of insulating material permanently secured to one of said heads or its exterior surface, a tubular axle passing through one of said heads and permanently secured thereto, a second tubular axle passing through said cylindrical member of insulating material and permanently secured to said head, spaced bands of conducting material encircling the outer surface of said cylindrical member of insulating material and secured thereto, binding posts within said cylindrical member and extending through holes therein spaced apart in line with said bands and contacting therewith on the outer surface of said cylindrical member, a supporting frame upon which each of said tubular axles are journaled, air tubes connected to the ends of said tubular axles within said cylindrical body, electric conductor wires connected to said binding posts, a tubing for holding and conveying said air tubes and electric conductor wires and adapted to being wound or unwound upon the outer surface of said cylindrical body, brushes contacting with said bands upon the cylindrical member, electric conductor wires connected with said brushes, and means for supporting said brushes.

4. A device of the character described, comprising in combination, a hollow cylindrical body, a head on either side of said body and secured thereto, a hollow cylindrical member of insulating material permanently secured to one of said heads, a tubular axle passing through one of said heads and permanently secured thereto, a second tubular axle passing through the other of said heads and through said cylindrical member of insulating material and permanently secured to said head, spaced bands of conducting material encircling the outer surface of said cylindrical member of insulating material and secured thereto, binding posts within said cylindrical member and extending through holes therein spaced apart in line with said bands and contacting therewith on the outer surface of said cylindrical member, a supporting frame upon which each of said tubular axles are journaled, air tubes connected to the ends of said tubular axles within said cylindrical body, electric conductor wires connected to said binding posts, brushes contacting with said bands upon the cylindrical members, electric conductor wires connected with said brushes, and a tubular arm surrounded with a sleeve of insulating material and attached to the supporting frame and upon which said brushes are held in position, the said tubular arm forming a conduit for the wires attached to said brushes.

Signed by me this first day of December, 1910.

CHESTER E. MACDUFFEE.

Witnesses:
GEO. A. TRAVER,
GEO. T. PINCKNEY.

---

Copies of this patent may be obtained for five cents each, by addressing the "Commissioner of Patents, Washington, D. C."